Patented Aug. 25, 1942

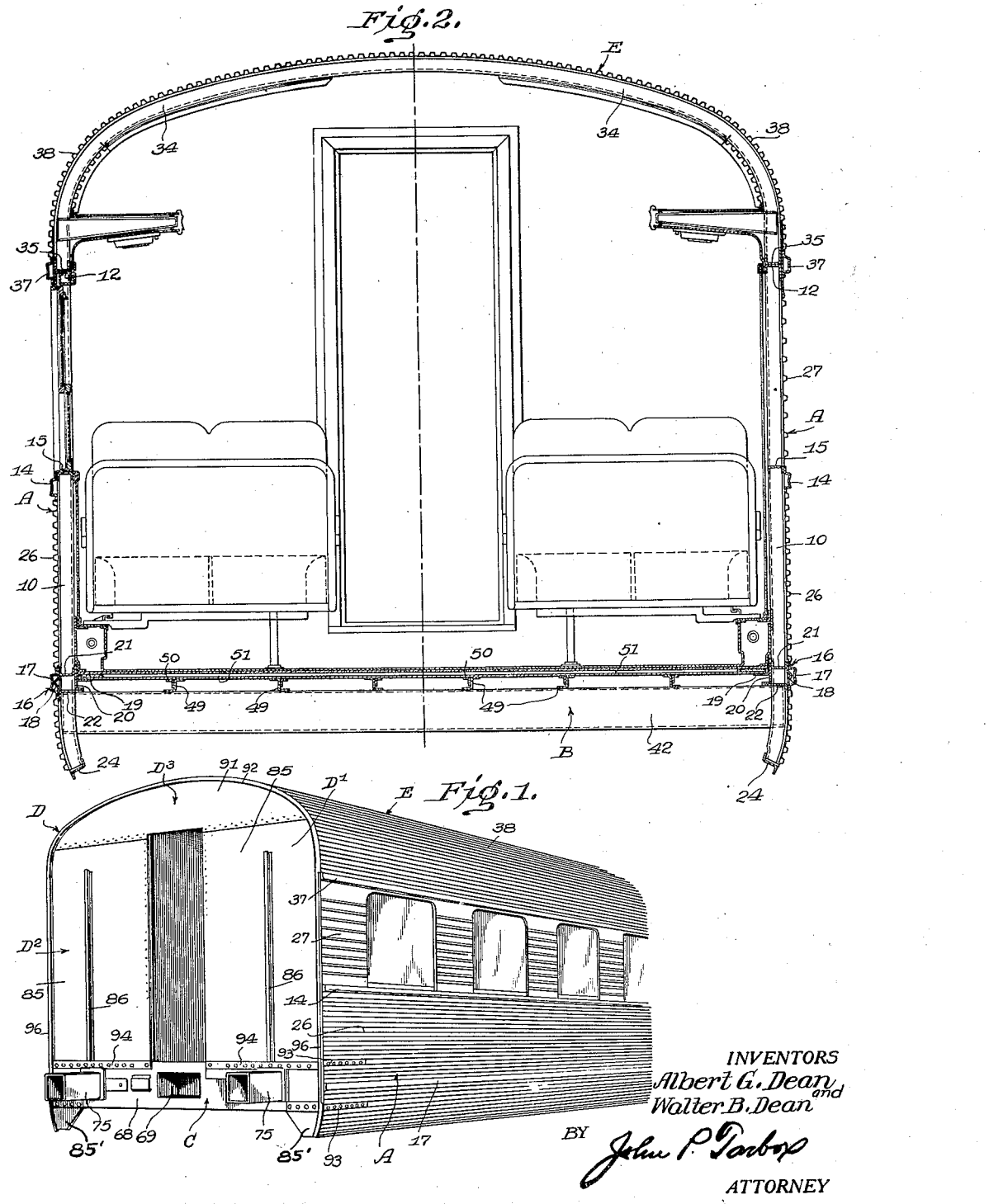

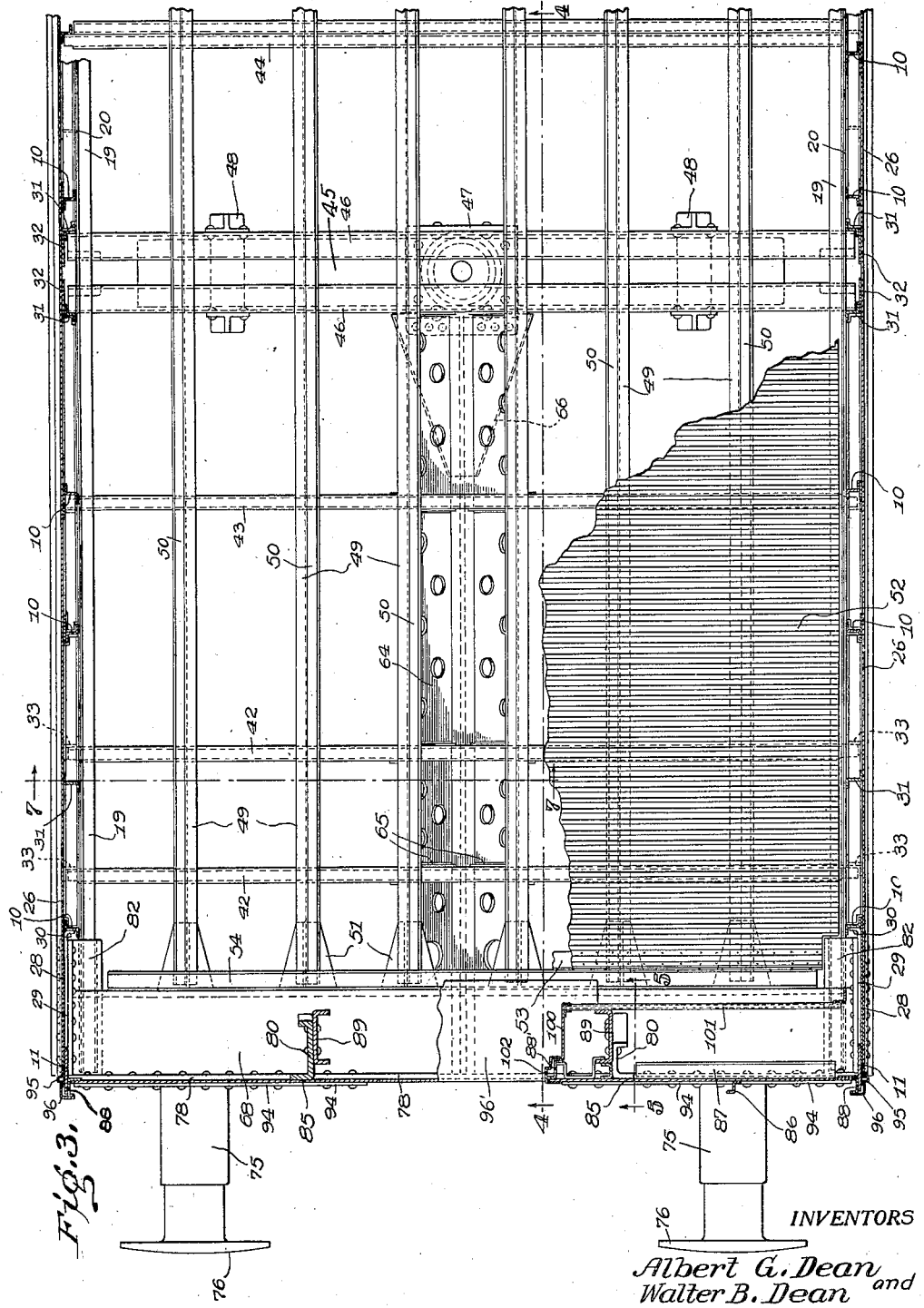

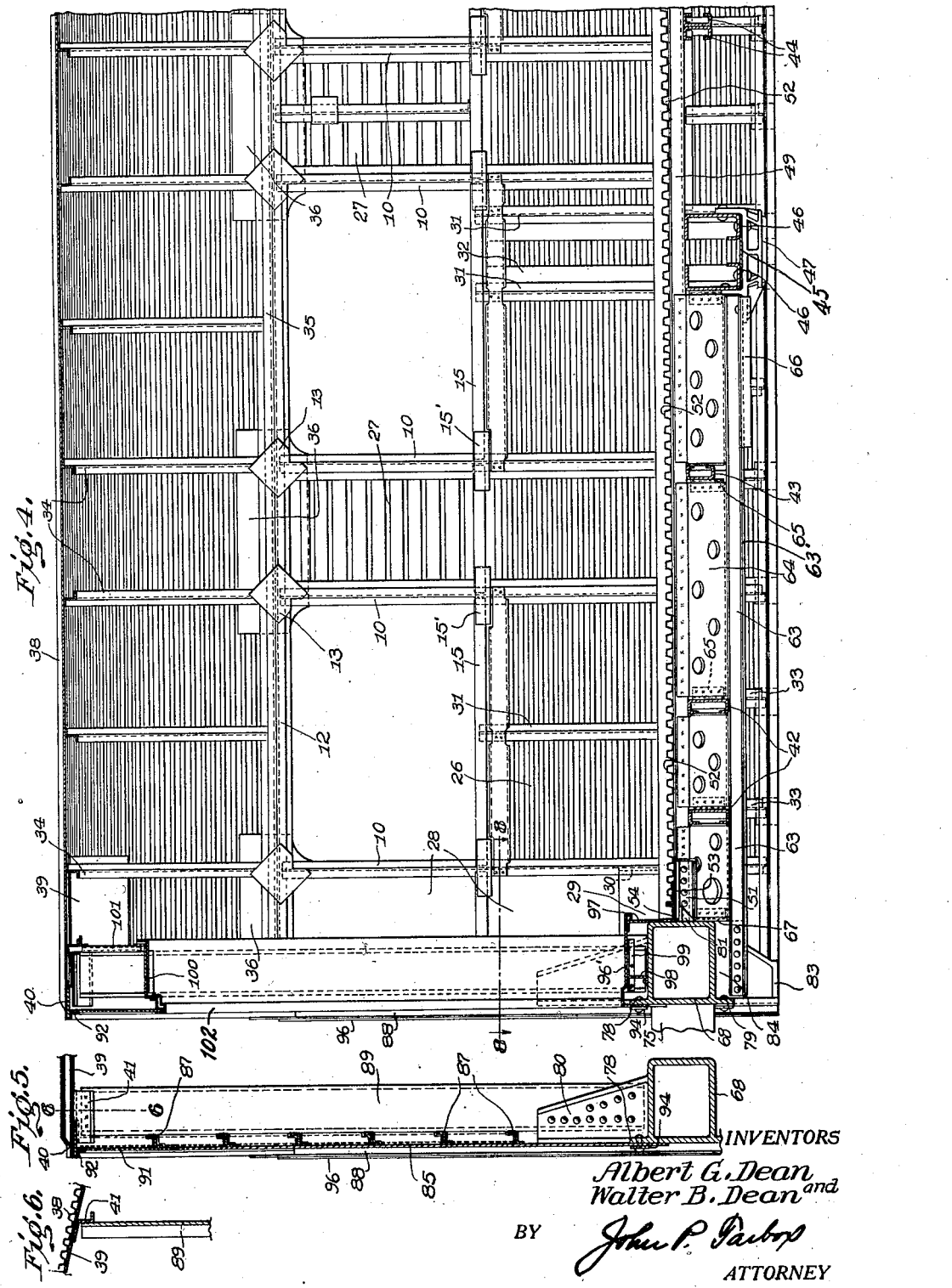

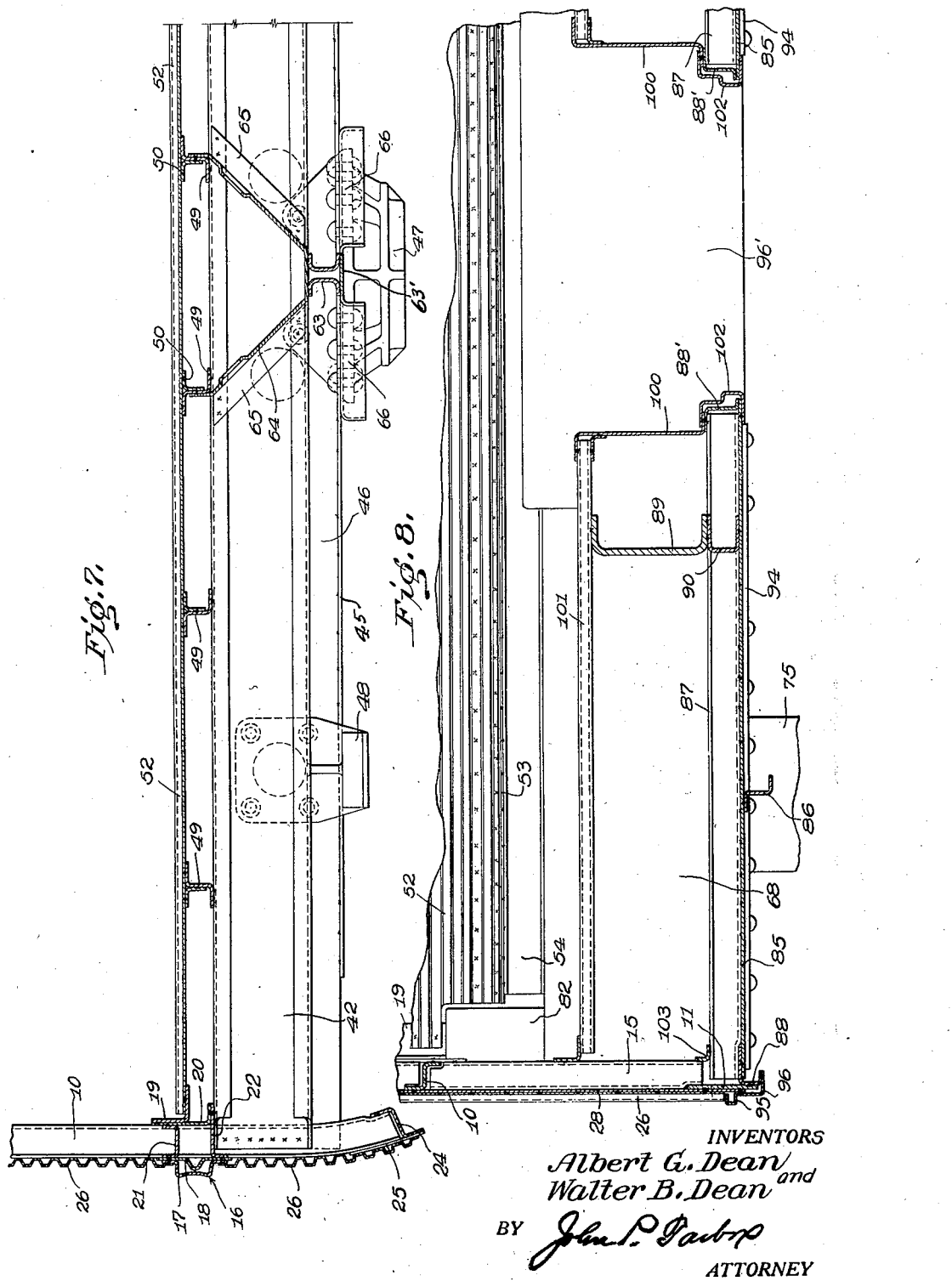

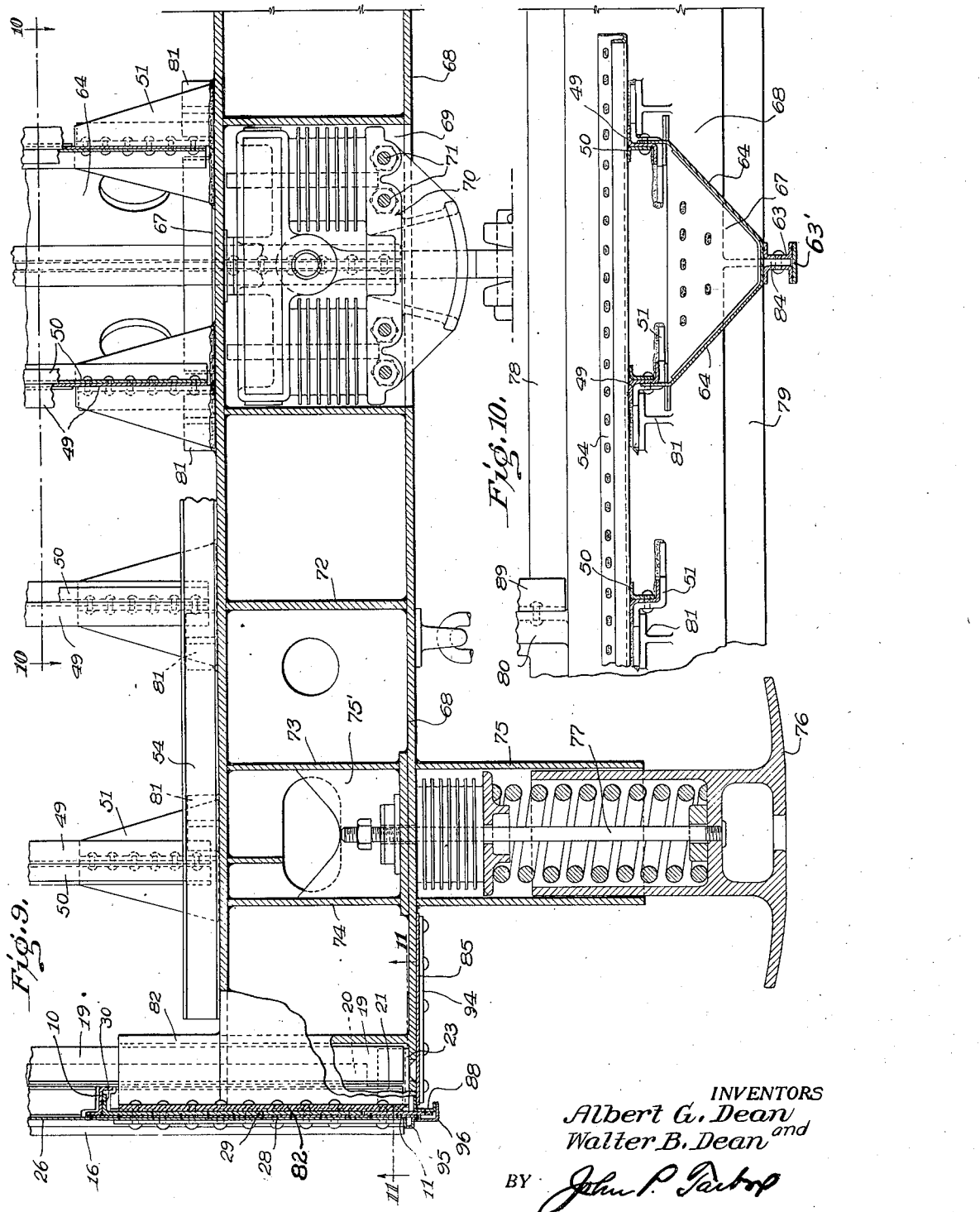

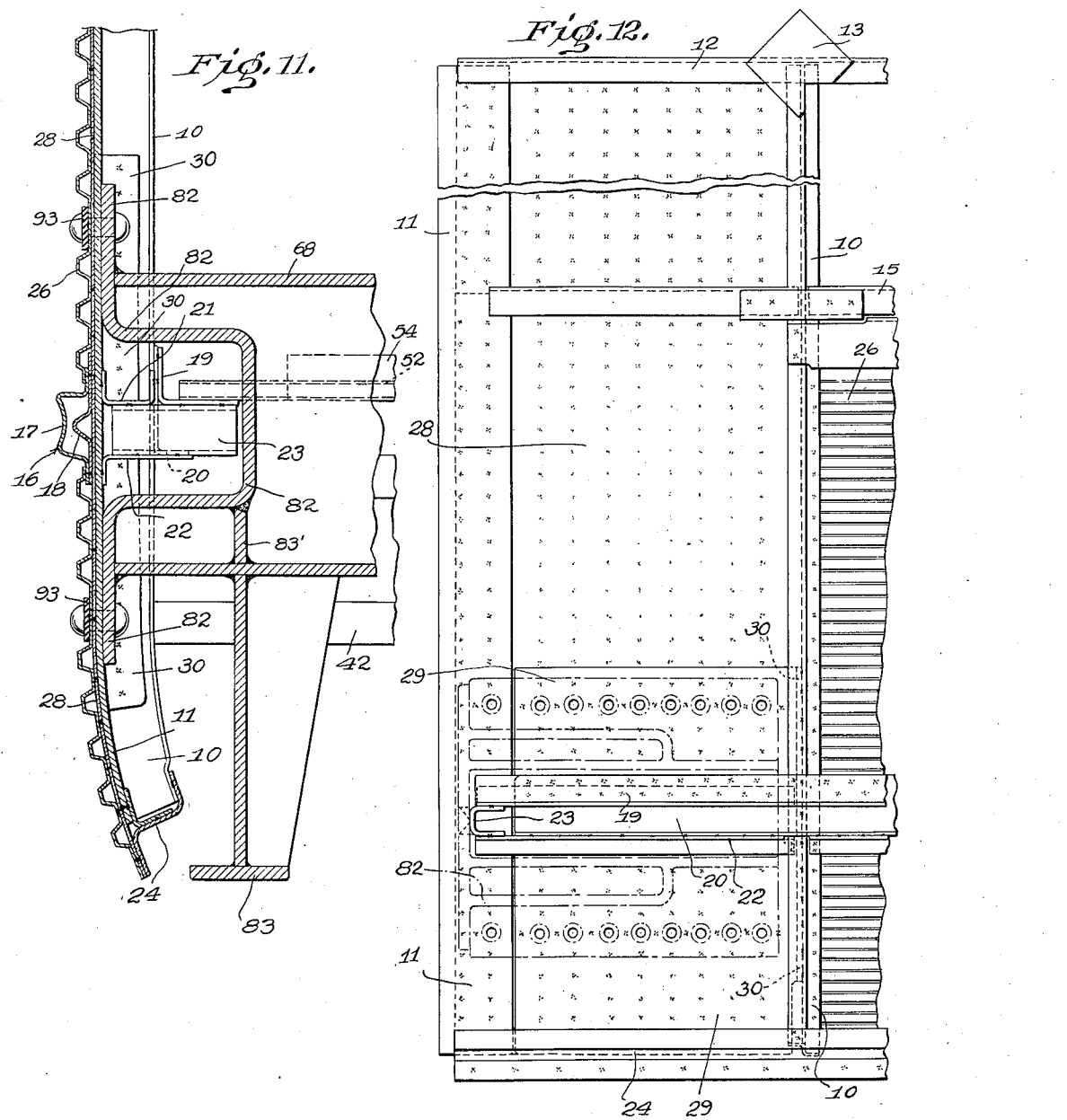

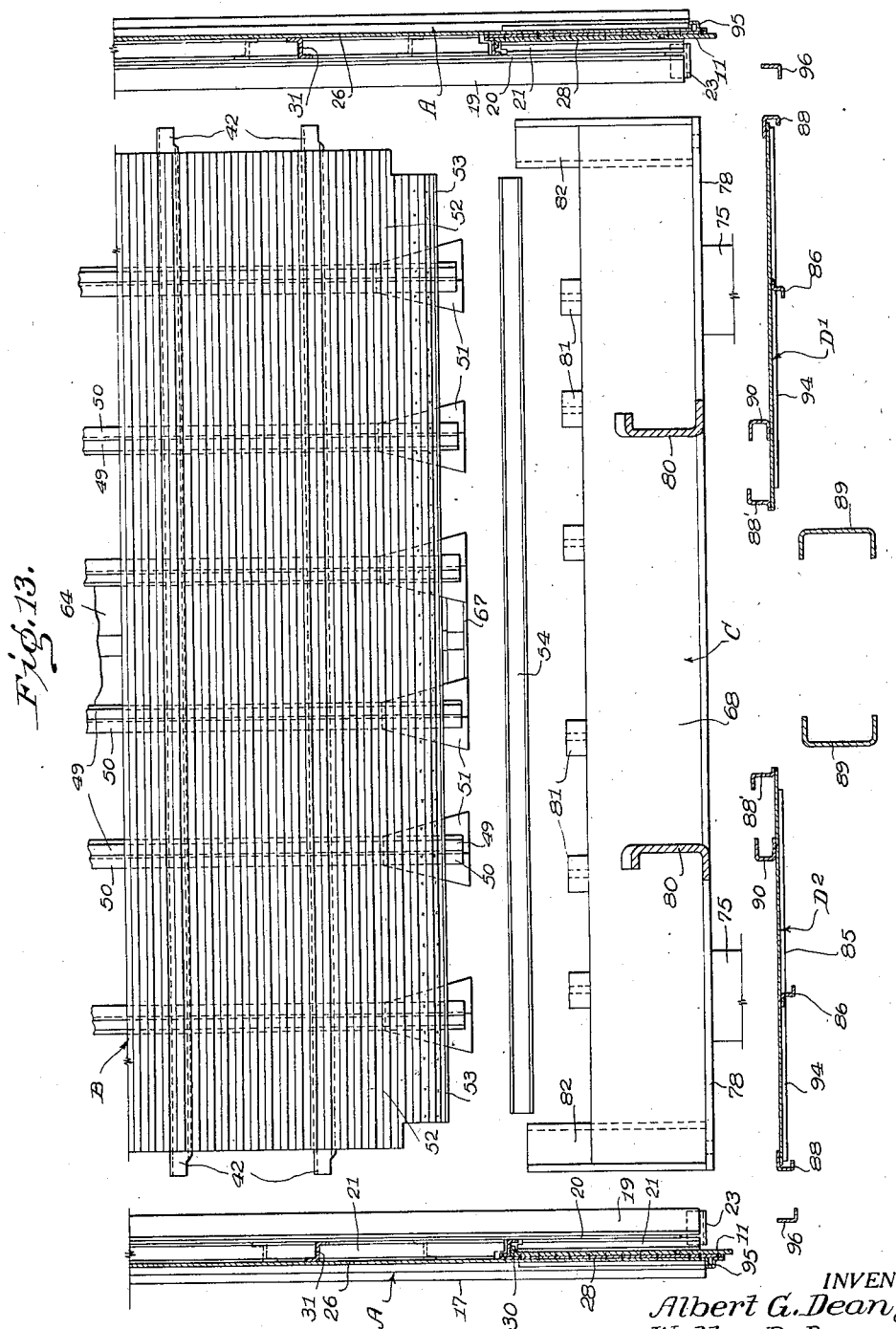

2,294,357

UNITED STATES PATENT OFFICE 2,294,357

VEHICLE BODY CONSTRUCTION

Albert G. Dean and Walter B. Dean, Narberth, Pa., assignors to Edward G. Budd Manufacturing Company, Philadelphia, Pa., a corporation of Pennsylvania Application May 18, 1940, Serial No. 335,977

25 Claims. (Cl. 105—397)

The invention relates to light weight vehicle bodies and particularly to such bodies fabricated in large part of sheet metal, and adapted for rail car use.

It is an object of the invention to construct a vehicle body of this class so that it can be readily fabricated in the plant of the manufacturer in sub-assembly units which can be easily handled and shipped as units to a distant point for final assembly there, with a minimum of jigging, into the completed body, thereby saving materially in the fabrication and shipping costs. To this end the bodies may be fabricated into separate side wall sub-assemblies, a roof sub-assembly, an underframe sub-assembly, an end sill sub-assembly and end wall sub-assemblies, each of said sub-assemblies being formed in its margins where it joins with adjacent sub-assemblies with final assembly joint structures which are readily joined together in final assembly, as by simple spot welding or riveting operations. The choice of parts entering into the various sub-assemblies is governed somewhat by the conditions, but is particularly designed to make the sub-assemblies readily fabricated at one location and shipped as sub-assemblies to a distant location, where they are joined into the complete body structure.

Being fabricated for the most part of light gauge sheet metal of high tensile strength such as high tensile 18 and 8 stainless steel, special attention is given in the fabrication to the construction of the joints between the sub-assemblies and the manner in which the buffing, draft and collision loads are taken by the body structure, and provision is made for taking care of these loads without unduly adding to the weight of the structure. The joints between the sub-assemblies are also designed to permit ease of joinder in final assembly. Preferably, where shipped to a distant point, the various sub-assembly units are all brought together in the place of manufacture, each of the sub-assemblies being provided with a number of gauge holes for accurately locating them with respect to adjacent units and the complete structure bolted together through these gauge holes with the units in their correct final assembly location. This partial assembly in the place of manufacture insures that the units will have their final assembly joints in proper alignment and fit and greatly simplifies the joinder, at the distant point, of the sub-assemblies after they have been shipped there in the knock-down condition. In this knock-down condition, they can be packed for shipment so as to take up but a fraction of the space required for shipping the finally assembled bodies.

The construction is further designed for bodies of the type having no center sill between the bolsters and to this end special provision is made to take the major buffing loads through the end sills into the side wall structures and the floor structure of the underframe. Special reinforcements are provided in the side wall structures to distribute the loading from the end sill and to take collision loading.

The end sill units are each a rigid box section beam of large cross sectional area suitably reinforced and extending from side to side of the body and formed in its ends with wide final assembly joint structures for securement to the side wall structures and on its top with strong upwardly extending brackets for securing the end wall collision posts. These units are provided with housings to receive the buffing and draft gear mechanism, and at their ends are provided with suitable jacking pad structures. Thus, the end sill structure and the buffing and draft gear mechanism may comprise a compact unitary sub-assembly readily joined in final assembly to the adjoining structural units.

While the foregoing general description points out some of the main objects of the invention and the manner in which these objects are realized, it will be understood that these and other and further objects and the manner in which they are attained will become more fully apparent from the following detailed description when read in connection with the drawings forming a part of this specification.

In the drawings:

Fig. 1 is a fragmentary perspective view of one end of a vehicle body according to the invention.

Fig. 2 is a typical vertical cross sectional view on a larger scale, the section on the opposite sides being longitudinally offset from each other, the left hand side being taken through a window opening, and the right hand side through a panel between the window openings.

Fig. 3 is a horizontal sectional plan view, on a still larger scale, of the end portion of the vehicle body, the section being taken some distance above the end sill, and the flooring being shown for the most part broken away.

Fig. 4 is a vertical longitudinal sectional view taken substantially along the line 4—4 of Fig. 3.

Fig. 5 is a detail vertical longitudinal sectional view taken along the line 5—5 of Fig. 3.

Fig. 6 is a detail sectional view taken on the line 6—6 of Fig. 5.

Fig. 7 is a fragmentary vertical transverse sectional view, on a further enlarged scale, taken along the line 7—7 of Fig. 3.

Fig. 8 is an enlarged fragmentary horizontal sectional plan view taken approximately on the line 8—8 of Fig. 4.

Fig. 9 is an enlarged fragmentary horizontal sectional view through the end sill and parts associated therewith.

Fig. 10 is a fragmentary vertical transverse sectional view taken on the line 10—10 of Fig. 9.

Fig. 11 is an enlarged fragmentary vertical transverse sectional view through the end sill and its connection to the side wall, the section being taken substantially on the line 11—11 of Fig. 9.

Fig. 12 is an enlarged detail elevational view of the end of a side wall unit as seen from the inside, parts being broken away, the dot and dash lines indicating the relation of the end portion of the end sill relative to the side wall unit.

Fig. 13 is an exploded sectional view in plan of an end of the vehicle body showing the final assembly joint structures of the various unit sub-assemblies entering into the end structure prior to final assembly.

As shown clearly in Figs. 1, 2 and 13, the body structure is a box section beam adapted to be supported adjacent its ends by the trucks, and may comprise the side wall units, designated generally by the reference character A, the underframe or floor assembly unit, designated by B, the end sill units, the one shown being designated by reference character C, the end wall unit, designated generally by the reference character D, this latter being preferably sub-assembled in three units designated generally by $D^1$, $D^2$ and $D^3$, and the roof unit designated by E. Since the structure in the intermediate portion of the body is generally similar to the ends, only one end has been illustrated, and from the description thereof the structure of the entire body will be clear.

Each of the unit assemblies is constructed and designed to cooperate with the associated units to carry its portion of the load and they are joined together in the completed body to form the unitary box-section beam. Each of the main units entering into the body structure will now be described.

Each side wall unit comprises, see Figs. 2, 4, 12 and 13, a vertical plate girder extending from end to end of the body and from the top of the window openings to some distance below the floor structure, the lower skirt portion below the floor structure being curved inward to give improved appearance. The entire height of the side wall unit constitutes a load carrying member including the skirt portion extending below the underframe or floor structure.

Each side wall unit comprises a plurality of spaced vertical posts 10. The posts intermediate the ends may be of simple Z cross section, with the web of the Z at right angles to the plane of the unit and the arms extending in the plane of the outer and inner faces, respectively. The intermediate posts are alternately spaced at greater and less distances, the greater distance spacing providing wide window openings, the posts flanking said openings forming parts of the window framing and having their outer arms extending toward the associated window opening. The end post 11 may be as shown a flat strip extending beyond the rest of the side unit sub-assembly to form a final assembly joint structure.

The tops of the posts are interconnected by a through-running downwardly facing channel 12 secured to the posts, as by spot welding, and forming part of the final assembly joint structure for connecting the side wall unit to the roof unit. Gussets 13 connect the inside faces of the posts 11 and channel 12 and project above the channel 12 to form a final assembly joint connection to the roof unit. These gussets may have cut-outs to clear the square corners of the windows and permit application of the windows from the inner side.

At the belt line below the window openings, the posts are interconnected on their outer faces by a through-running moulding strip 14 of flanged channel section and by channel section members 15 extending between the posts and secured thereto and to the moulding strip 14, the ends of the channels terminating at opposite sides of a post being connected together and to the post by a strip 15', see Fig. 4.

At the floor level, the side wall sub-assembly is provided with a strong box section longitudinal chord member or side sill, designated generally by numeral 16, and comprising a through-running outer moulding strip 17 of flanged channel section secured to an intermediate centrally ribbed through-running strip 18 to form a box section, the combined member 17, 18 being secured to the posts. Chord or sill member 16 further comprises a through-running inner member comprising angles 19 and 20 secured to each other through their vertical arms, and through these arms to the posts, their horizontal arms being vertically spaced. The outer and inner through-running members 17, 18 and 19, 20 are closed to box section by channels 21 and angles 22 extending between the posts and secured thereto, and the channels 21 being secured to upper double thickness flange of member 17, 18 and to the vertical double thickness arm of member 19, 20 while the angles 22 are secured, respectively, to the lower double thickness flange of member 17, 18 and to the horizontal arm of angle 20. Member 20 terminates a slight distance short of members 19, 21 and 22 at the end of the side wall unit, and these three members are at their extreme end interconnected by an inwardly facing channel 23, Fig. 11, which forms part of a final assembly joint structure for securing the side wall sub-assembly to the end sill unit.

At the bottom of the skirt, the posts are further interconnected by a longitudinal through-running member 24 of Z cross section, the web extending across the ends of the posts, and its inner upwardly projecting arm being secured to the inside face of the posts while its outer arm extends downwardly and is secured to the posts by gussets, as 25, see Fig. 7.

Outer paneling of longitudinally corrugated sheeting designated generally by reference character 26, is secured to the outer faces of the posts and to the through-running moulding strips 14, 17 and the lower through-running member 24. Between the window openings, the posts are further interconnected by longitudinally corrugated paneling as 27, the corrugations of these panels being spaced more widely than the corrugations of paneling 26, mainly to improve the appearance.

At the end the side wall unit is further strengthened and reinforced to provide a strong final assembly joint structure between it and the end sill and to enable it to resist collision shocks. To this end the corrugated sheeting 26 between the end post 11 and the first Z-section post 10 is reinforced by a plate 28 secured to the corrugations at the bottom of the corrugations, this combination converting the outer sheathing in this region into a plurality of closely spaced box-section columnar structures, strong to resist collision. This reinforced sheating extends in this region from top to bottom of the side wall unit, see Fig. 12. At the bottom, an additional heavier gauge plate 29 is applied to the inner face of the so reinforced sheating and secured thereto as by numerous spot welds. This plate extends from the inner margin of the flat post 11 with which it corresponds in gauge to the first Z-section post 10 to the web of which it is secured by an end flange 30. It is to this triple-thickness reinforced portion of the side wall unit that the adjacent end of the end sill unit is adapted to be secured in final assembly.

As shown in Fig. 4, the side wall unit may have additional short posts, as 31, extending between belt-rail member 14, 15 and the side sill 16 or extending all the way to the bottom member 24, the latter more particularly in the bolster region, and in this region the additional post members 31 and sheathing are additionally reinforced by flat plates 32 secured to the posts and sheathing.

Where the cross members of the underframe do not come in the same transverse plane as the main posts 10, short post sections as 33 are provided between the side sill 16 and the bottom longitudinal member 24. The webs of the posts 10, 31, and 33 extending to the bottom member, for the most part, provide the final assembly joint structures of the side unit sub-assembly to which the bolster and transverse floor beams of the underframe or floor structure are secured and the horizontal arm of angle 19 provides a final assembly joint structure to secure the flooring proper. Alternatively, the angle 19 may be a part of the floor sub-assembly, secured, in final assembly, through its vertical arm to the angle 20 and posts 10.

As shown in Figs. 1, 2, 4, 5 and 6, the roof unit comprises the arched carlines 34, which may, like the posts 10, be of Z cross section, and correspond in location longitudinally to the location of the posts. In the regions of the wide window openings an additional carline is provided centrally of the openings. As is clear from Fig. 2, the side margins of the roof sub-assembly extend in the same vertical plane as the side wall units and, in fact, form upward continuations, when the two units are assembled, of the load-carrying side walls. The ends of the carlines are, like the tops of the posts, connected by through-running longitudinal channels 35, the bottom walls of which, in final assembly, abut the bottom walls of the top channels 12 of the side units and are secured thereto as by spot welding. Wide gussets 36, extending from window opening to window opening, and from the end window opening to the end of the roof, are strongly secured to the roof carlines and channels 35 and extend downwardly to form final assembly joint structures for attaching the roof unit still further to the side wall units. In addition, an upper through-running moulding strip 37 of flanged channel section is secured in sub-assembly to the adjacent channel 35 and the gussets 36, this channel, in final assembly, bridging the joint and also serving as a final assembly joint structure. Extending between the channels 37 on opposite sides is the roof sheathing, which may comprise longitudinally corrugated sheathing, as 38, secured to the carlines and in its lateral margins to the top flanges of the flange channels 35.

The roof structure so described constitutes a compression-resisting member, and at the ends the roof unit is further reinforced in the region where the end door posts are secured to it in final assembly, by plates, as 39, see Figs. 5 and 6, disposed between the carlines and corrugated sheathing and secured to each as by spot welding. These plates extend inwardly from the end of the roof sub-assembly to and beyond the second Z carline 34. The end of the roof is coextensive with the end of the side wall sub-assembly and, like it, is provided with a flat marginal member of increased gauge, as 40, this member being secured to the end of the corrugated sheathing, the corrugations of which are flattened down at the extreme end. This member 40, like the end post members 11, forms a final assembly joint structure for securing the end wall sub-assembly. To the inside of the reinforced section of the roof, at which an end post is to be secured, is secured through one arm thereof, see Figs. 5 and 6, a short angular member 41 forming a final assembly joint structure for the top of the corresponding end door post.

The underframe or floor structure sub-assembly, as appears in Figs. 4 and 13, is comprised of transverse floor beams, as 42, 43 and 44, and bolsters, as 46, extending from side to side and having their ends formed to provide overlapping final assembly joint structures with posts of the side wall units. These floor beams are generally of channel section with inturned flanges from the side walls thereof. In some locations, as at 43, and at 44, the beams are of less vertical depth than in others, as at 42, and beam 44 is strengthened by securing two channels back to back. The bolsters 46 each consist of two spaced channels facing toward each other and flanged only in their lower side walls, these channels being secured together by a bottom plate 45 overlapping and secured to the bottom side walls of the channels. At the center the bolster carries the center plate casting 47 through which it is supported on the truck, this casting being firmly riveted to the bolster. Laterally, the side bearing castings 48 are rigidly secured thereto as by riveting.

To the tops of the transverse floor beams and bolsters are secured a number of spaced longitudinal stringers 49, these being shown six in number, these stringers running from end to end of the underframe and being substantially equally spaced from each other and from the side walls. Toward their ends, these stringers, instead of being simple Z-section members, are reinforced, from a point inwardly of the beam 44 to their outer ends by an angle 50 having one arm connected to the web of the Z and its other arm in the plane of the top arm of the Z.

The ends of the stringers all terminate in a common vertical plane which substantially coincides with the inner face of the end sill in final assembly, and each of the stringers has strongly connected to it at its end, as by a number of rivets, a generally Z-section bracket 51 of heavier gauge than the material of the stringer proper. This bracket is widened laterally to provide a wide abutment for the stringer against the end sill, and this wide abutment forms a final assembly joint structure for securing each of the stringers to the end sill in final assembly.

The stringers are finally covered by transversely corrugated floor sheeting, as 52, this sheeting being strongly secured to the stringers through their top flanges and extending almost from end to end of the stringers. However, in order to provide ready access from above to join the stringers to the end sill in final assembly, the corrugations terminate some distance short of the ends of the stringers, the endmost being secured to a terminal angle 53 having a long arm overlapping and secured to the corrugations, and a short vertical arm which can be located prior to the attachment of the long arm to the corrugations to be spaced just the proper distance from the ends of the stringers, so that after the stringers are finally secured to the end sill in final assembly, the space between the end sill and the vertical short arm of the angle 53 may be closed by a channel, as 54, having side walls of unequal height, the shallower one of which overlapping the short vertical arm of the angle and being spot welded thereto, and the deeper arm overlapping the end sill wall and being welded thereto (see Fig. 10).

While the underframe according to this invention is generally of so-called center-sill-less construction, it is not wholly without a central longitudinal reinforcement, at least, between the bolster and the end sill. This region of the underframe is stiffened by a center sill section of generally triangular cross section, see Figs. 3, 4, 7 and 10. This center sill section is built up of two top chords constituted by the two center stringers 49 and a bottom chord 63, the top and bottom chords being joined between the cross members by webbing 64 having a flat bottom portion for securement to the bottom chord, inclined portions extending between the bottom chord and the respective top chords and vertical top marginal portions overlapping and secured to the stringers 49 forming the top chords. The inclined web portions may be secured to the bolster 46 and floor beams 42 and 43 by separate angles, as 65, or alternatively by integral flanges at the ends of the web portions abutting the bolster or floor beams. Lighting holes may be provided in the webbing, as shown.

The bottom chord is conveniently built up into a rigid box section beam by two outwardly facing channels, the side walls of which are secured together at bottom by a flat plate 64' and at top by the flat bottom portion of the webbing 64. At the inner end the place of the bottom plate 63' is taken by a triangular plate bracket 66 flanged in its lateral edges and having its base riveted to a forwardly projecting portion of the center plate casting 47, see Figs. 3, 4 and 7.

At its outer end, the bottom chord is extended beyond the stringers to form a final assembly joint with the end sill unit. An additional final assembly joint structure for securing the center sill section to the end sill provided by a triangular plate 67 having its flanged sides secured to the end of the inclined sides of the webbing 64 and its body portion arranged to overlap and be secured in final assembly to the inner face of the end sill.

The end sill sub-assembly unit, shown more particularly in Figs. 3, 4, 9, 10 and 11, comprises a rigid substantially straight rectangular box-section beam 68 extending from side to side of the body. To secure light weight and yet great strength, it is preferably fabricated out of a suitable high tensile alloy steel and, since it is to be used in a body having a centrally arranged draft gear and laterally arranged buffer gears, it is so constructed as to house these gears. To this end, the sill is provided with a central pocket 69 open at its outer end, the sides of the pocket extending between the front and rear walls of the box section beam so that the pocket is substantially the full longitudinal depth of the sill and thus of sufficient length to house substantially the entire draft gear generally indicated at 70, and secured in pocket by the bolts 71.

Laterally of the draft gear pocket, the box section is reinforced by fore and aft partitions 72, 73, 74 and directly in front of the two partitions 73 and 74, the outer wall of the sill is reinforced by a plate welded to its inner face and upon which the partitions abut, and from the face of the sill and welded thereto projects the forward extension 75 forming a pocket to receive a buffing means. To further reinforce the sill in the region of the buffer, the spaced partitions 73 and 74 may be interconnected by a transverse partition or partitions 75'. The buffer head 76 is guided in the housing 75 and held therein by a central bolt 77 secured to the head and passing through the springs acting on the buffer head, in this instance shown as a combined coil and rubber spring nest separated by a plate. The inner end of this bolt passes through an opening in the reinforced outer wall of the sill at the bottom of the pocket, and a nut threaded on its inner end prevents undue outward movement of the buffer head and thus maintains the parts assembled. Access is had to the inner end of the bolt and nut through a suitable opening in the bottom wall of the sill.

As shown in Figs. 4 and 5, the outer wall of the end sill is extended upwardly and downwardly by flanges to provide strength, these flanges, as 78, 79, providing final assembly joint structures to which the end wall may be secured in final assembly. In the region of the end door posts, the end sill is provided with upwardly extending brackets, as 80, of channel cross section and tapering from a wide base in the longitudinal direction to a narrow top portion. Centrally, in a vertical direction, of the inner face of the sill is provided a series of inwardly projecting laterally widened seats 81 upon which the brackets 51 at the ends of the stringers come to rest in final assembly. At its ends, the box section of the sill is closed by a plate 82 which extends well above and below the top and bottom walls of the box section and is strongly secured as by welding to all sides of the box cross section. This plate also extends inwardly of the box cross section a substantial distance to provide a wide overlap with the final assembly joint portion of the side wall structure. About midway of the height of this closing plate, it is formed with a deep channel open at the inner end but closed at the outer end by the outer wall of the box section end sill. This channel not only reinforces the end of the sill but provides a recess to receive the side sill structure 16 of the side wall unit (see Fig. 11), the members 19, 21 and 22 of which and the end channel 23 connecting them abutting, in final assembly, the forward wall of the end sill, see Fig. 9, and being secured thereto. Adjacent the ends, the end sill is provided with downwardly extending jacking pad projections, as 83, rigidly secured and braced to the bottom wall of the sill by longitudinal and transverse webs, Fig. 11. A strut 83' braces the sill bottom to the channel of the end closure plate in this region.

At its central portion, the bottom wall of the end sill is provided with a downwardly projecting longitudinally extending rib 84, Figs. 4 and 10, which is adapted in final assembly to telescope between the channels of lower chord 63 of the center sill and be rigidly secured thereto as by a line of rivets.

As clearly appears in Fig. 1, the end wall D may be sub-assembled in three units designated generally by the reference character $D^1$, $D^2$ and $D^3$. The units $D^1$ and $D^2$ are identically constructed except that they are rights and lefts. A description of one will therefore suffice. As shown in Figs. 1, 3 and 5, each of these units $D^1$ and $D^2$ comprises an end wall plate 85 extending vertically from its connection to the end sill to the top of the end doorway opening and laterally from the doorway opening to the adjacent side wall. At the lower side corner, the plate 85 is provided with a downwardly extending portion 85' which covers the downwardly projecting jacking pads 83. This plate 85 is preferably stiffened and reinforced, as shown, by a vertical outer member 86 which may be a Z-section member welded to the plate through one arm. On its inner side, it is reinforced by a plurality of spaced transverse members 87 which may be of Z cross section welded to the plate through an arm of the Z. At the side, the plate is reinforced by a vertical post member 88 which may be of inwardly-facing channel section, see Fig. 8, the inner side wall of the channel being deep to provide overlap with edge of the plate 85 to which it is secured by welding. This post member is arranged to form a final assembly joint structure for securement of the end wall unit to the side wall unit. At the door opening, the plate 85 is reinforced by a Z 88' secured to the margin of the plate and the transverse members 87.

A channel collision post 89 of heavier gauge may form a part of each of the end wall units $D^1$ and $D^2$, but is preferably separated prior to final assembly. It may be secured thereto through the inner Z section reinforcements 87, and spacer channels 90 extending between the Z-members 87 and secured through their side walls, respectively to the plate 85 and the post 89, see Fig. 8. The post overlaps at bottom, in final assembly, the upwardly extending bracket 80 on the end sill and is strongly secured thereto by rivets. At top, it overlaps the bracket 41 on the roof unit and is rigidly secured thereto as by welding.

The end wall includes additionally the top unit $D^3$ which comprises an end wall plate 91, extending from side to side above the doorway opening, and having its bottom margin overlap and secured to the top margins of the plates 85 of units $D^1$ and $D^2$, while its top margin conforms to the margin of the roof and is secured in final assembly to the roof through an angle 92 secured to the margin of the plate through one arm and having its other arm in overlapping relation with reinforced margin of the roof and secured thereto.

The plate 91 of this top end wall unit may be reinforced by a transverse member 87 similar to the members 87 on the units $D^1$ and $D^2$, and may be sceured to the vertical door posts 89 in a manner similar to the securement of those units to the posts.

Having described the various units entering into the vehicle body structure of the invention and their final assembly joint portions, the manner in which they may be brought together and securely joined together in final assembly will now be described. The side wall units and the roof unit are brought together as shown in Figs. 2 and 4, with the bottom wall of the top marginal channel 12 of the side wall unit in abutting relation to the bottom wall of the marginal channel 35 of the roof unit and secured together as by spot welding through the abutting walls of the channels. The upwardly projecting portions of the gussets 13 on the inner face of the side wall then overlap the channel 35 and adjacent roof carlines 34 and are spot welded thereto in the overlap. On the outside, the wide gussets 36 on the roof unit overlap the outer faces of the channel 12 and adjacent posts 10, as well as the upper margin of the corrugated sheathing 27 between the window opening, and are secured to all these parts in the overlap by spot welding. The lower flange of the molding strip 37 also overlaps and is welded, through the gussets 36, to the outer side wall of the channel 12 of the side wall unit. Thus it will be seen that a very strong joinder between the side wall units and the roof is provided which enables the vertical marginal portion of the roof to assist the side wall units in carrying the vertical loading.

The underframe sub-assembly may be finally assembled with the sdie wall sub-assemblies by having the ends of the transverse floor beams and bolster overlap the vertical posts and strongly secured thereto through a plurality of spot welds, as shown, for example, in Fig. 7. The overlapped flanges of the members 20 and 22 of the side sills 16 overlap in final assembly the tops of the bolsters and floor beams and are spot welded thereto. Additionally, the lateral margins of the corrugated flooring overlap and are welded to the inwardly extending arm of through-running member 19 of the side sill. In some cases it may produce a better welding condition to have the through-running member 19 form a part of the underframe sub-assembly and to weld it in final assembly to the vertical arms of the member 20 and the posts of the side wall unit.

After the underframe sub-assembly has been so finally assembled with the side wall sub-assemblies, the composite side sills 16 of the side wall unit form in effect a part of the underframe, and in fact provide the main members for resisting longitudinal buffing and draft loads.

The end sill sub-assembly may now be brought into place with its end plates 82 overlapping the heavily reinforced end regions of the side wall sub-assembly as indicated in the dot and dash lines of Fig. 12, and with the brackets 51 at the ends of the floor stringers 49 abutting the rear face of the end sill and resting on the seats 81 projecting from said face. As shown in Figs. 11 and 12, the end plate 82 of the end sill is strongly secured to the reinforced end of the side wall unit by upper and lower rows of rivets, the large number of which is clearly indicated by the rivet holes shown in Fig. 12. It will be noted that the corrugations of the sheathing are omitted at the line of rivet holes, and further reinforcing plates 93 are provided on the outside of the sheathing in this region. At the same time, the channel 23 secured to the members 19, 21 and 22 of the side sill 16 has its bottom wall in abutting relation with the outer wall of the end sill and is opposite a hole formed through said wall and it is arc-welded to the margins of this hole, see Figs. 9 and 12.

Similarly, the brackets 51 have their widened ends abutting the end sill arc-welded to the inner wall of the end sill and the seats 81 projecting therefrom, see Figs. 9 and 10.

It will be noted that the side sills 16 and the stringers 49 which carry the main buffing and draft loads from the end sill are arranged substantially in the horizontal plane through the axis of the sill and since the buffing and draft gears are similarly arranged, eccentric loading is substantially avoided.

The end sill is further connected to the triangular center sill portion of the underframe extending inwardly to the bolster by riveting its central downwardly extending rib 84 to the ends of the channels of the bottom chord 63 of the center sill, see Fig. 4, and by arc-welding the end plate 67, secured to the webbing of the center sill, in the region where it abuts the rear face of the end sill through the holes provided in said plate for this purpose.

After the ends of the stringers 49 have been welded to the end sill, the channel member 54 is secured in place in the manner already described.

It remains now to bring the end wall structures in place to complete the main body structure assembly. This may be done by first assembling the plate sub-assemblies D¹, D² and D³ by welding the plate 91 to the overlap of the tops of the plates 85 and then bringing the entire end plate structure in place as shown in Figs. 4 and 5, and securing the marginal final assembly angle 92 or channel 88 to the marginal final assembly portion of the side and roof units which they overlap. An inner angle 103 may also connect the ends of the horizontal frame members, as 15 and 87, of the side and end units, respectively, see Fig. 8. At the bottom the plates 85 overlap the upwardly extending flange 78 on the outer face of the end sill and are securely riveted thereto. A reinforcing strip 94 is preferably used to strengthen the riveted joint. At the sides, where the plates 85 or extensions 85' thereof project downwardly to the bottom of the skirt of the side walls, they overlap the entire front face of the sill and may be secured as shown in Fig. 1 to the downwardly projecting flange 79 of the sill in a manner similar to their securement to the upwardly extending flange.

If the collision posts 89 were pre-assembled with the end wall units as above described, their lower ends in overlapping relation with the upwardly extending brackets 80 from the top of the end sills are securely riveted thereto, see Fig. 5, and their upper ends, overlapping the brackets 41 from the roof, are securely spot welded thereto.

It will be seen, however, that the collision posts 89 could readily and preferably, as shown in the exploded view of Fig. 13, form separate units independent of the end wall units including the end wall plates and their stiffening members, since this will allow the end wall units to be more closely packed for shipment and the posts can just as readily be secured to the end wall plates and their reinforcements after these plates have been secured to the end sill, side and roof units.

Suitable trim paneling can be provided at various locations, some of which will now be briefly described. For example, a trim strip, as 95, Fig. 9, comprising an inwardly facing channel approximately the depth of the corrugations of the side wall sheathing and having a flange from one of its side walls, may be utilized to close the ends of the corrugations at the end of a side wall. This strip may be assembled with the side wall sub-assembly, as shown in Fig. 9, by welding its flange to the flat strip marginal post 11 of the side wall sub-assembly. After the final assembly, the final assembly joint between the side and end wall units may be covered by an angle strip, as 96, having one arm overlap the flange of the strip 95 and the other overlap the outer side of channel 88 and spot welded thereto.

Since the floor is below the level of the top of the end sill, the threshold for the door opening is raised a step above the floor and may comprise a generally horizontal threshold strip 96', see Fig. 4, having a flange at its outer margin secured to the vertical outer flange 78 of the end sill and inwardly thereof, the horizontal portion is supported from the end sill by a transverse angle 97 and a spaced Z-section member 98. At the ends the said portion is supported by an angle 99, see Fig. 4. As shown in Figs. 4 and 8, the top and sides of the door frame are extended inward by deep Z-section finish members as 100, to the inner margin of which are secured members 101 for supporting and securing the inner paneling. Other finish members 102 of generally channel section and forming the door jambs are secured to the outer plate 85, 91 and the inwardly extending finish members 100, as appears clear from Figs. 4 and 8.

While a specific embodiment of the invention has been herein described, it will be understood that changes and modifications may be made by those skilled in the art departing from the details of this embodiment, and such changes and modifications are intended to fall within the spirit and scope of the appended claims.

What is claimed is:

1. A side wall unit for vehicle bodies comprising longitudinal chords, vertical posts and load-carrying longitudinally corrugated sheathing secured to said chords and posts, the end of said side wall unit being reinforced for most of its height and for a distance inwardly from the end to and including at least the second post from the end by a smooth plate interposed between the posts and corrugated sheathing and secured thereto substantially throughout, whereby the unit is stiffened adjacent its end to enable it to absorb collision shocks without materially increasing its overall weight.

2. A side wall unit for vehicle bodies comprising longitudinal chords, vertical posts, and load-carrying longitudinally corrugated sheathing secured to said chords and posts, the post at the end of said side wall being of a flat strip form and of heavier gauge than the sheathing, and being extended inwardly to the next post by a plate secured to the sheathing and of a gauge corresponding to the gauge of the end post and forming with the end post a wide reinforced area for the securement of an end sill unit.

3. A side wall unit according to claim 1 in which said unit is reinforced by a second plate of heavier gauge than the first, this last reinforcement being in the lower region of the reinforced end of the side wall unit, which region forms a final assembly joint structure for connection to an end sill.

4. A joint construction between a side wall unit and an end sill unit for vehicle bodies, the side unit comprising longitudinal chords, vertical posts and load-carrying longitudinally corrugated sheathing, and an extensive reinforced plate structure overlapping the inside of the corrugated sheathing and extending between at least the two endmost posts and secured to said corrugated sheathing and posts, the end sill having an end plate extending above and below and some distance inwardly beyond the main body of the sill, this plate overlapping the reinforced area of the side wall unit, and being strongly secured thereto in the overlap.

5. A joint construction according to claim 4, in which the joinder is by two lines of securing means of substantially equal strength symmetrically arranged above and below the axis of the end sill.

6. A joint construction according to claim 4, in which the side wall unit has one of its chords formed as a strong columnar side sill extending at the level of the joint and continuous through the joint, the end plate of the end sill being longitudinally recessed to permit the passage of the side sill, and its end being in substantially abutting relation with a portion of the end sill and secured thereto.

7. A side wall unit for vehicle bodies comprising longitudinal chords, vertical posts and load-carrying longitudinally corrugated sheathing secured to said chords and posts, the post at the end of said unit extending beyond the end of the corrugated sheathing and forming a final assembly joint structure for attachment to an end wall unit, and a trim strip closing the ends of the corrugations and secured to said extended portion of the post.

8. A side wall unit for vehicle bodies extending from the top of the window opening down below the flooring level a substantial distance and curved inward below said level to provide a skirt, said unit comprising a top chord above the window openings, a belt chord below the window openings, a strong composite side sill chord at the floor level and a bottom chord at the margin of the skirt, posts connecting said chords and longitudinally corrugated load-carrying sheathing interconnecting said posts and chords from the belt chord to the lower chord and between the window openings.

9. An end sill unit for vehicle bodies comprising a straight box-section beam extending from side to side of the body, the ends of said beam being provided with wide closure plates extending above and below and inwardly beyond the body of the sill to provide final assembly joint structures for attachment of the sill to the side walls of the body.

10. An end sill according to claim 9, in which the end plates are provided with a deep horizontally extending recess at approximately the axis of the sill.

11. An end sill unit for vehicle bodies comprising a straight box-section beam extending from side to side of the body, the beam being provided with pockets closed at their inner ends and adapted to house the draft and buffing gears so that no parts thereof extend inwardly beyond the sill unit, the inner wall of the sill being free of draft gear and buffer projections and providing an unbroken vertical face for the securement of longitudinal members of the underframe.

12. An end sill unit according to claim 11 in which the buffer housing pockets are arranged at opposite side of the center and project forwardly of the body of the sill and the draft gear housing pocket is arranged centrally within said body.

13. An end sill unit for vehicle bodies comprising a straight box-section beam extending from side to side of the body and having a vertical outer face, said beam having longitudinally continuous upwardly and downwardly extending flanges in continuation of its outer face and symmetrically reinforcing said beam on opposite sides of its central horizontal plane and providing attachment means.

14. An end sill unit for vehicle bodies comprising a straight box-section beam extending from side to side of the body, said beam having a central downwardly projecting rib on its bottom face forming a final assembly joint with a longitudinal member of the underframe, and spaced inwardly projecting seats from its inner face to support the ends of the underframe stringers.

15. A vehicle body construction comprising an end sill having a straight vertical inner face, spaced seats projecting inwardly from said face, longitudinal floor stringers and brackets secured to the ends of said stringers, and resting on said seats, said brackets having their ends abutting the inner face of the sill and rigidly welded thereto in final assembly.

16. A vehicle body construction according to claim 15, in which the brackets have their abutting ends laterally widened to provide a large area through which the brackets are integrally welded in final assembly to the end sill.

17. A vehicle body construction comprising an end sill having a downwardly projecting longitudinally extending rib from its bottom wall, a bolster, a pair of stringers arranged on opposite sides of the vertical longitudinal center line of the body, and having their ends secured to the inner face of the end sill, said stringers extending inwardly beyond the bolster and secured to its top face, said stringers comprising the top chord of a center sill extending between the bolster and end sill, the bottom chord of said center sill comprising a beam secured at its inner end to the bottom portion of the bolster and at its outer end to the downwardly projecting rib on the end sill, and webbing joining each of the top chords to the bottom chord.

18. A vehicle body construction according to claim 17 in which the webbing is secured to the outer face of the bolster and the inner face of the end sill and to intermediate floor beams.

19. A vehicle body construction comprising end wall and side wall sub-assemblies, a side wall sub-assembly comprising longitudinal chords, vertical posts and longitudinally corrugated sheathing secured to the chords and posts, the end post comprising a flat strip projecting beyond the corrugated sheathing, the end unit comprising an end plate stiffened by vertical and transverse members and, at its lateral margin, by a vertical post of inwardly facing channel section arranged to overlap, through its bottom wall, the projecting portion of the end post on the side wall unit and secured thereto in final assembly.

20. A vehicle body construction according to claim 19, in which an angular finish strip, secured to the outer side wall of the channel post of the end sub-assembly, covers the joint between the side and end sub-assemblies.

21. A vehicle body construction having a substantially straight end sill provided with a vertical outer face, and top and bottom flanges extending said face above and below the body of the sill, an end wall structure including an end plate having its lower margin in overlapping relation with the flat outer face of the sill and secured thereto through at least the upper of said flanges.

22. A vehicle body construction according to claim 21, in which the end sill is provided with downwardly projecting jacking pads adjacent its ends and the lateral portions of the end plate are extended down to cover them and secured in this lateral region to both top and bottom flanges of the end sill.

23. A vehicle body construction comprising an end sill, having a substantially straight vertical outer face, side wall and roof structures secured together, the side wall structures being secured to the ends of the end sill and projecting therebelow, and both side and roof wall structures having reinforced marginal portions extending a short distance beyond the outer face of the end sill, and an end wall structure comprising an end wall plate having its lower portion fitting against and secured to the outer face of the end sill and its lateral and top marginal portions reinforced with angular reinforcements and fitting within the reinforced marginal portions of the side wall and the roof and secured thereto.

24. A vehicle body construction comprising an end sill having a flat outer face and upwardly projecting collision post brackets, roof and side wall structures secured together and the side wall structures being secured to ends of the end sill, the roof and side wall structures having marginal reinforcements projecting a short distance beyond the outer face of the end sill, an end wall structure comprising an end plate having a doorway opening therein and overlapping and secured at the bottom to the outer face of said sill and reinforced by an angular reinforcement in its outer margin, one arm of which overlaps and is secured to the projecting marginal reinforcements of the side wall and roof structures, collision posts inwardly of said end plate overlapping and secured at the bottom to the upwardly projecting brackets on the sill and at the top to a reinforced area of the roof structure, said posts being spaced from the end plate, by transverse stiffening members secured to said plate and posts.

25. A vehicle body according to claim 24 in which the space between the posts and plate is further bridged by channel spacers extending between the transverse stiffeners and secured to the posts and plate.

ALBERT G. DEAN.
WALTER B. DEAN.